United States Patent [19]

Frisch et al.

[11] 4,021,378

[45] May 3, 1977

[54] MICROCELLULAR FOAMS

[75] Inventors: Kurt Charles Frisch, Grosse Ile, Mich.; Donald Henry Russell, Cherry Hill, N.J.

[73] Assignee: Atlantic Richfield Company, Los Angeles, Calif.

[22] Filed: July 31, 1975

[21] Appl. No.: 600,661

[52] U.S. Cl. .................... 260/2.5 BE; 260/2.5 A; 260/2.5 AY; 260/77.5 R; 260/858; 260/859 R; 264/54
[51] Int. Cl.² .................................. C08G 18/14
[58] Field of Search ............... 260/2.5 BE, 2.5 AY, 260/858, 859 R, 2.5 AA; 264/54

[56] References Cited

UNITED STATES PATENTS

| | | | |
|---|---|---|---|
| 3,523,093 | 8/1970 | Stamberger | 260/2.5 BE |
| 3,652,507 | 3/1972 | Burk, Jr. et al. | 260/77.5 AB |
| 3,869,413 | 3/1975 | Blankenship | 260/2.5 BE |
| 3,935,132 | 1/1976 | Gerkin et al. | 260/858 |

*Primary Examiner*—Eugene C. Rzucidlo
*Attorney, Agent, or Firm*—Coleman R. Reap

[57] ABSTRACT

Microcellular urethane foams are prepared by causing the in situ formation of a urethane polymer from a cyclic nitrile carbonate and a polyol in a matrix of a thermoplastic polymer, preferably a thermoplastic polyurethane. The composition is preferably prepared by mixing the reactant ingredients in the dry powdered state and subsequently heating them in a closed container in the shape of the desired article. The amount of ingredients selected is that which will produce a molded article of the desired density.

15 Claims, No Drawings

MICROCELLULAR FOAMS

BACKGROUND OF THE INVENTION

1. FIELD OF THE INVENTION

This invention relates to polyurethane compositions and, more particularly, to expanded polyurethane compositions and molded articles made from them.

2. PRIOR ART

Expanded polyurethane compositions are conventionally prepared by reacting one or more polyol compounds, i.e., polyhydroxyl-containing compounds, such as polyester polyols and polyether polyols with a polyisocyanate in the presence of moisture, the polyisocyanate component being present in excess of the stoichiometric amount to provide for the production of carbon dioxide, which is used as an expanding agent, by reaction of the excess polyisocyanate with the moisture. Expanded polyurethanes are also made by curing a polyurethane prepolymer in the presence of an external expanding agent, as by extruding the prepolymer through the barrel of an extruder equipped with one or more inlet parts to permit the introduction of the expanding agent, e.g., gaseous blowing agents, such as carbon dioxide; volatile solvents, such as halogenated hydrocarbons; volatile hydrocarbons, such as pentane; or chemical blowing agents, such as N,N'-dinitrosopentamethylenetetramine into the molten prepolymer as it passes through the pressurized barrel of the extruder. The molten material expands upon being discharged from the nozzle of the extruder barrel as a result of the lower pressure outside of the extruder. These methods present the disadvantages that either monomeric isocyanates must be used with their attendant hazards or an external expanding agent must be incorporated into a molten prepolymer.

United Kingdom patent specification No. 1,028,908, published on May 11, 1966 discloses, as an invention, the incorporation of a polyisocyanate into a monomeric reaction mixture containing hydroxyl groups which are available for reaction with the polyisocyanate to produce carbon dioxide and thereby produce a cellular product. This patent also discloses an embodiment in which a polymer is present. The invention in this patent, like that of the above described procedures, requires the handling of highly toxic isocyanates and liquid reactants.

Because of the above and other disadvantages of prior art procedures, science and industry researchers are continuously searching for methods of producing controlled density polyurethanes which avoid the nuisance and hazards of handling molten and/or toxic materials.

SUMMARY OF THE INVENTION

The present invention discloses a method of preparing controlled density polyurethanes which does not require the handling of polyisocyanates nor special procedures involving the use of external expanding agents. Accordingly, it is an object of the invention to present an improved method of controlling the density of polyurethanes. It is another object of the invention to present a convenient method of molding controlled density articles from polyurethane. It is another object of the invention to present a method of preparing controlled density polyurethane articles in situ. It is another object of the invention to present molded polyurethane articles of any desired density. It is another object of the invention to present a method of expanding thermoplastic polymers. These and other objects of the invention will become apparent from the following description and examples of the invention.

The above objects are accomplished by incorporating into a thermoplastic polymer, such as a thermoplastic polyurethane, a polyol and a cyclic nitrile compound in an amount which will produce a composition having the desired density. The reactants are combined, uniformly mixed, and placed into a compression mold or other suitable container having the configuration of the finished article. The mold is heated, while being maintained under pressure, to a temperature sufficiently high to effect the urethane reaction between the polyol and the cyclic nitrile compound. The degree of crosslinking of the product can be controlled by choosing polyols and cyclic nitrile carbonates having varying functionalities. If desired the reactants can be extruded and/or injection molded to produce products such as expanded sheet material. A catalyst may, if desired, be incorporated into the reaction mixture.

DESCRIPTION OF THE INVENTION

THE MATRIX POLYMER

The polymer or copolymer which is used as the matrix polymer should be sufficiently thermoplastic, i.e., substantially free of crosslinking, to expand in the plastic state when the carbon dioxide is released during the formation of polyurethane resulting from the reaction of the cyclic nitrile carbonate and the polyol. It has been observed that the best results are obtained when the matrix polymer is similar in properties to the polyurethane being formed. Thus, while thermoplastic polymers such as polyolefins, polyamides, polyvinyl chloride, polystyrene and the acrylics, including the acrylates and acrylonitrile can be used with success in the invention by choosing polymers or copolymers or alloys of different polymers having physical properties, i.e., melting points and molecular weights, that render them compatible with the polyurethane being formed, it is preferred to use thermoplastic polyurethane as the matrix polymer. The reason for this is that the expanding polyurethane can interact with the matrix polyurethane and form a product having any desired physical properties, i.e., flexibility, rigidity, uniformity, etc. The molecular weight of the polyurethanes useful as the matrix polymer is not critical, however, the most preferred thermoplastic polyurethanes for use as the matrix polymer in this invention are those having a molecular weight of about 15,000 to 100,000 and preferably about 25,000 to 60,000 and a softening point of about 70° to 250° C and most preferably about 100° to 200° C.

Any of the conventional thermoplastic polyurethanes can be used as the matrix polymer. The thermoplastic polyurethanes are usually prepared from polyisocyanates and polyols having a functionality of about 1.8 to 2.2 and in the most preferred embodiments the functionality of the polyisocyanate and polyols used is about 1.95 to 2.05. In other words, it is desirable to use polyisocyanates and polyols having a functionality near or at 2 to limit the degree of crosslinking. Any of the polyisocyanates commonly used to prepare polyurethanes can be used to prepare the matrix polymer. Polyisocyanates useful in the prepration of thermoplastic polyurethane matrix polymers include aromatic diisocyanates such as tolylene diisocyanate, diphenyl-methane diisocyanate, etc., aliphatic diisocyanates such as 1,4-butane diisocyanate, 1,6 hexane diisocyanate, 1,6 hexene diisocyanate, etc., and alicyclic diisocyanates such as 1,4-cyclohexane diisocyanate and 4,4'-dicyclohexylmethane diisocyanate. The aromatic diisocyanates are preferred because of their lower toxicity. The polyols useful in the preparation of the matrix polymer can be any of the polyols commonly used in the preparation of polyurethanes. Typical useful polyols include the organic polyhydroxyl compounds described below.

The matrix polymer may contain other additives commonly added to polymers, such as lubricants, surfactants, colorants, fillers, etc.

THE CYCLIC NITRILE CARBONATES

The cyclic nitrile carbonates used in the invention have the structure

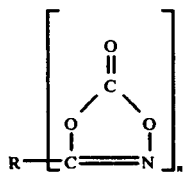

wherein $n$ is at least 2 and R is an organic radical having from 2 to about 200,000 carbon atoms and is free of reactive hydrogens as determined by the Zerewitinoff test. Generally, R will consist predominantly of carbon and hydrogen but there can be included therein other elements or groups as well, as long as they do not materially affect the radical's basic characteristic of being non-interfering in condensation-rearrangement reactions between cyclic nitrile carbonates and reactive hydrogen-containing compounds or otherwise adversely affect the properties of the desired product. Examples of such non-interfering groups are alkoxy, nitro, and halogen groups. R can be saturated or ethylenically or acetylenically unsaturated, aliphatic radicals, saturated or ethylenically unsaturated cycloaliphatic radicals or aromatic radicals, including alkaryl, aralkyl, and fused ring aromatic radicals.

R often contains from 2 to 50 carbon atoms when it is aliphatic and from 6 to 30 carbon atoms when it is aromatic. When R has a carbon content in this range, it preferably contains 2 to 12 carbon atoms when aliphatic and 6 to 18 carbon atoms when aromatic. R may also be of much higher molecular weight and may contain up to 200,000 or more carbon atoms. Cyclic nitrile carbonates in which R has a high molecular weight may be prepred, for instance, by polymerizing unsaturated cyclic nitrile compounds, such as acrylonitrile carbonate. The preparation of cyclic nitrile compounds of this type is disclosed in U.S. Pat. No. 3,480,595, the disclosure of which is incorporatd herein by reference.

The number of cyclic nitrile functional groups present in the cyclic nitrile carbonates used in the invention is determined by the degree of crosslinking and the density desired in the product and is at least 2 and may vary to as high as 100,000 or more per molecule. Thus, $n$, in the above structural formula, is at least 2. In the preferred embodiment of the invention, $n$ varies from 2 to about 6.

The preparation of the cyclic nitrile carbonates useful in the invention forms no part of the invention, and one desiring to explore their preparation may refer to the above-mentioned patent and U.S. Pat. Nos. 3,531,425; 3,507,900 and 3,609,163; all of which are incorporated herein by reference.

Typical of the aliphatic cyclic nitrile compounds useful in the invention are:

1. Saturated aliphatic and cycloaliphatic compounds such as 1,2-ethane di(nitrile carbonate); 1,4-butane di(nitrile carbonate); 1,20-eicosane di(nitrile carbonate); 1,40-tetracontane di(nitrile carbonate); 5-ethyl-1,16-hexadecane di(nitrile carbonate); 1,3,5-pentane tri(nitrile carbonate); 1,4,6,10-decane tetra(nitrile carbonate); 6-methyl-1,5,8-octane tri(nitrile carbonate); 1,4-cyclohexane di(nitrile carbonate); 2-ethyl-1,3,5-cyclohexane tri(nitrile carbonate); etc.

2. Unsaturated aliphatic and cycloaliphatic compounds such as 1,2-ethene-di(nitrile carbonate); 1,4-butene-2-di(nitrile carbonate); 1,6,9-nonene-2-tri(nitrile carbonate); 3-propyl-1,5,7-heptene-2-tri(nitrile carbonate); 1,4-butyne-2-di(nitrile carbonate); 1,6-hexyne-2-di(nitrile carbonate); 1,4-cyclo-hexene-2-di(nitrile carbonate); 1,4-cyclo-hexene-2-di(nitrile carbonate); etc.

3. Aromatic compounds such as benzene-1,4-di(nitrile carbonate); 1,4-dimethylbenzene-2,5-di(nitrile carbonate); and 1,3-diethylbenzene-2,4-di(nitrile carbonate); methylbenzene-di(nitrile carbonate); 1-benzylbenzene-2,4-di(nitrile carbonate); naphthalene-1,7-di(nitrile carbonate); 1,2,3,4-tetrahydronaphthalene-di(nitrile carbonate); 2,2-diphenylpropane-p,p'-di(nitrile carbonate); diphenylmethane-p,p'-di(nitrile carbonate); anthracene-2,8-di(nitrile carbonate); 1,2-diphenylethane-p,p'-di(nitrile carbonate); biphenyl-di(nitrile carbonate); 1,2-diphenylethane-o,o' -di(nitrile carbonate); and stilbene-p,p'-di(nitrile carbonate).

The preferred cyclic nitrile compounds are the saturated aliphatic cyclic nitrile carbonates in which R contains 2-12 carbon atoms such as 1,2-ethane di(nitrile carbonate); 1,4-butane di(nitrile carbonate); and 1,4,8-octane tri(nitrile carbonate).

THE ORGANIC POLYHYDROXYL COMPOUNDS

The organic polyhydroxyl compounds useful in the invention include aliphatic and aromatic polyols and polymers such as polyester polyols, polyether polyols, and polylactones, and similar compounds having from 2 to 6 or more, but preferably 3 or more, —OH groups or mixtures of these per molecule and having 2 to about 100,000 carbon atoms with hydroxyl numbers ranging from 12 to 1,100 or more. Mixtures of two or more of these compounds can also be employed. The organic polyhydroxyl compounds may contain non-interfering groups, i.e., groups or atoms which do not interfere with the reaction of the polyol and the cyclic nitrile groups or otherwise adversely affect the desired properties of the product. The aliphatic and aromatic polyols include, for example, ethylene glycol; diethylene glycol; propylene glycol; 1,3-butylene glycol; 1,6-hexanediol; butenediol; butynediol; amylene glycols; 2-methyl-pentanediol-2,4; 1,7-heptanediol; glycerine; neopentyl glycol; trimethylol propane; pentaerythritol; cyclohexane dimethanol; sorbitol; mannitol; galactitol; talitol; xylitol; 1,2,5,6-tetrahydroxyhexane; styrene glycol; bis ($\alpha$ hydroxyethyl)-diphenyl-dimethylmethane; 1,4-dihydroxybenzene; etc.

The polyhydroxyl-containing polymeric compounds useful in this invention include, for instance, polyhydric polyalkylene ethers, polyhydroxyl polyesters, and hydroxyl group-containing, preferably hydroxyl-group terminated, polymers, etc. The polymers may contain non-interfering groups such as urethane linkages. The polyhydric polyalkylene ethers often have a molecular weight greater than about 350 and may be derived, for example, by the polymerization of alkylene oxides such as ethylene oxide, propylene oxide, butylene oxide, and the like. Polyhydric polyalkylene ethers may also be prepared by the polymerization of the cyclic ethers such as, for example, dioxane, tetrahydrofuran, and the like, and by the condensation of an alkylene oxide with a glycol such as ethylene glycol, propylene glycol, butylene glycol, and the like.

The hydroxyl-containing polyesters may be obtained by the reaction of aliphatic or aromatic dicarboxylic acids with aliphatic or aromatic polyhydric alcohols in the manner well known to the art in proportions that result in esters having at least two reactive hydroxy groups per molecule. Any polyols may be used to form the esters and illustrative of such alcohols are those listed above in the discussion of suitable alcohols as the active hydrogen-containing reactant. Included within the suitable esters are the hydroxy-containing mono- and diglycerides of castor oil, tall oil, soya oil, linseed oil, etc. The latter esters and thioesters are usually prepolymers prepared by the reaction of the fatty acid glyceride with low molecular weight polyols. Illustrative, for instance, of castor oil-based prepolymers are propylene glycol monoricinoleate, propylene glycol mono-12-hydroxystearate, neopentyl glycol monoricinoleate, dehydrated castor oil, ethylene glycol monoricinoleate, ethylene glycol mono-12-hydroxystearate, triglyceride of ricinoleic acid, epoxidized castor oil, and pentaerythitol tetraricinoleate. Other suitable hydroxy-containing polymers such as those derived from 1,4-butadiene; isoprene; 2,3-dimethylbutadiene; 2-chloro-1,3-butadiene; 2-cyano-1,3-butadiene; and other polymerizable ethylenically unsaturated monomers such as $\alpha$-olefins of up to 12 carbon carbon atoms such as ethylene, propylene, butene, etc.; styrene, acrylonitrile, acrylic acid or esters, methacrylic acid or esters, hydroxy alkyl acrylates or methacrylates, vinyl chloride, vinylidine chloride, and the like; hydroxyl-terminated condensates of phenol and lower aldehydes and hydroxy-terminated polyepoxides. Other suitable hydroxyl-containing compounds are styrene-allyl alcohol and styrene-vinyl alcohol copolymers.

As noted above, the functionality of the cyclic nitrile component and the organic polyols is at least two. It is desirable that the functionality of one or both of the reacting components be considerably higher than two for the production of highly crosslinked polymers. In general, it is preferred that the cyclic nitrile compounds used have a functionality of two and the functionality of the organic polyols be varied, since it is much more economical to prepare polyfunctional hydroxyl compounds than polyfunctional cyclic nitril compounds.

The relative amounts of thermoplastic polymer and polyurethane-producing component, i.e., the cyclic nitrile carbonate and the polyol or polyols, used in the shelf stable composition or in the preparation of the expanded product are usually about 100 to 200 parts by weight of thermoplastic polymer and about 20 to 100 parts by weight of polyurethane-producing component. In a preferred embodiment the relative amounts are 100 to 200 parts by weight of thermoplastic polymer and about 40 to 80 parts by weight of polyurethane-producing component.

The ratio of cyclic nitrile compound to organic polyol compounds may vary depending upon the desired properties, e.g., the rigidity and density of the foamed product being prepared and the functionality of the reacting materials. In general, it is desired to use amounts of cyclic nitrile compound and organic polyhydroxyl compounds that will provide a ratio of cyclic nitrile functional groups to total polyhydroxyl groups of about 0.7 to 10:1 and preferably about 0.7 to 1.4:1.

The condensation-rearrangement reaction between the cyclic nitrile compounds and the reactive hydrogen-containing compounds which causes the expansion of the matrix polymer may be carried out by thermal initiation; however, it is usually preferred to add a catalyst to the formulation to facilitate reaction at lower temperatures and in shorter periods of time.

Suitable catalysts for the preparation of the compositions of the invention are those generally found useful to catalyze the reaction between cyclic nitriles and reactive hydrogen-containing compounds. The following catalysts are typical of those which may be used in the compositions of the invention. The catalyst may be basic material such as a tertiary amine having a pKa value greater than 3, e.g., triethylamine, as disclosed in U.S. Pat. No. 3,531,425, the disclosure of which is incorporated herein by reference. Another catalyst for use in accordance with the present invention is a combination of a first metal selected from Groups III through V of the Periodic System and a second metal selected from Groups I and III and the iron series of Group VIII of the Periodic System as disclosed in U.S. Pat. No. 3,652,507, which disclosure is incorporated herein by reference. Yet another useful catalyst in accordance with the present invention is set forth in U.S. Pat. No. 3,702,320 which disclosure is also incorporated herein by reference. In accordance with this particular patent, a compound of aluminum, tin, titanium, zinc, bismuth or iron is used in the reaction mixture. If the compound is one of aluminum, tin, titanium or bismuth, the reaction is run in the absence of metals of Groups I, II, and the iron series of Group VIII of the Periodic System. On the other hand, if the metal compound is a compound of zinc or iron, the reaction is run in the absence of metals of Groups III through V of the Periodic System. Other catalysts useful in the present invention are the organic and inorganic fluorides, as disclosed in co-pending U.S. Pat. No. 3,766,147 which is incorporated herein by reference. Still other catalysts useful in the present invention are the N-oxides of amines. The use of these catalysts is disclosed in U.S. Pat. No. 3,793,254, incorporated herein by reference. The preferred catalysts are the tertiary aliphatic, aromatic, and heterocyclic tertiary amines such as triethylene diamine, pyridine, N-ethylmorpholine, and N,N-dimethyl aniline. The catalyst, when present, is used at a concentration of about 0.001 to 10% and preferably about 0.01 to 2.0% based on the total weight of cyclic nitrile compound and reactive hydrogen-containing compound in the formulation.

In addition to the essential components, pigments, flow improvement agents and other property modifying materials may be included in the formulation. Thus, finely divided fillers such as carbon black, talcum, chopped glass fibers, etc.; colorants, surfactants, such as polysiloxane or polysiloxane-poly(oxyalkylene)-copolymer, and emulsifiers, etc. may be added to the formulation. Similarly, other polymeric or monomeric materials, chain transfer agents, etc. may be added to the formulation to further modify the product.

In preparing the products of the invention, the ingredients are mixed and heated in a suitable pressurizable reaction chambers to the point at which reaction between the cyclic nitrile carbonate and the polyol occurs. When this temperature is reached the matrix polymer is plastic and is capable of expansion. During the reaction, carbon dioxide is produced as a by-product of the reaction, as is disclosed in the above-mentioned patents, forming very small bubbles in the matrix polymer. The reaction is permitted to proceed until the reaction between the cyclic nitrile carbonate and polyol components is substantially completed or until that amount of carbon dioxide is released which will result in the formation of a product having the desired density. The amount of carbon dioxide produced and the degree of crosslinking in the product is controlled by regulating the relative amount of reactants and by selecting cyclic nitrile carbonates and polyols which have the degree of functionality to produce the desired effect. As noted above, the matrix polymer is carefully chosen so that it will reach the degree of plasticity necessary for expansion at the temperature at which the reaction takes place. During the reaction, the reaction mixture is maintained in a closed area under pressure of a sufficient magnitude to prevent the escape or premature expansion of the carbon dioxide. When the molten mixture is extruded or the pressure is otherwise reduced the compressed carbon dioxide bubbles will expand, thereby causing the matrix polymer to expand to produce a product of reduced density. Those skilled in the art can easily determine the optimum formulations and reaction conditions for producing expanded articles having the desired properties.

In one embodiment of the invention the reaction mixture, including the matrix polymer, the cyclic nitrile carbonate, the polyol, the catalyst, if one is used and other components which it is desired to incorporate into the formulation at this point, is prepared by blending the reactants, which may be in the liquid or solid state, depending upon the nature of the reactants. If desired a solvent may be added to insure a more complete mixing of the ingredients. After mixing, the solvent, which is preferably volatile, is evaporated to produce a solvent-free mixture. After the reaction mixture is thoroughly blended it is ready for use. Shaped articles may be manufactured by injection molding or compression molding the reaction mixture. Expanded sheet or other continuous product may be produced by extruding the reaction mixture from an extruder at elevated temperatures and pressures. These methods are well known and no further description is necessary to explain them.

According to a second embodiment of the invention, the matrix polymer, the cyclic nitrile carbonate, the polyol, the catalyst, if used, and other desired ingredients are combined to produce a dry, preferably finely ground, storage-stable composition. In this embodiment of the invention, the particle size of the composition is preferably such that most of the composition has a particle size range of about 10 to 500 microns and most preferably about 50 to 250 microns. The ingredients may be first combined and ground to the desired size or they may be separately ground and subsequently combined in the desired ratios. Since heat initiates the reaction between the cyclic nitrile carbonate groups and the hydroxyl groups of the polyol it may sometimes be necessary or preferable to separately grind the reactive components of the formulation, however, the grinding can often be accomplished under conditions such that too much excess heat is not produced. One particularly suitable method is freeze-grinding in which the material is frozen before grinding to minimize the temperature rise of the mixture. There are many well known suitable methods for grinding materials to a suitable size and the method of size reduction used forms no part of the invention. If practical, it is preferable to first mix the ingredients and then grind them as this procedure will provide a greater degree of uniformity of product. As stated above, it is important that the reactive components be substantially homogeneously dispersed in the composition so that the condensation-rearrangement reaction can proceed substantially to completion to produce an uniformly expanded polymeric product having the desired properties. The ground and blended composition is ready for immediate use or it may be stored indefinitely, preferably in moisture proof containers at room temperature.

The storage stable compositions of the invention are ideal for use in small operations such as those in which molded objects are made by placing a predetermined amount of molding powder in a mold and heating the mold until the composition is fully expanded to fill the mold. The use of the molding powders of the invention in this type of operation makes it unnecessary to use expensive equipment such as extruders or injection molding machines and thus offers a small end user a method of producing controlled density polymeric products without large capital investments.

The following examples illustrate preferred embodiments of the invention. Unless otherwise indicated, parts and percentages are on a weight basis. The following ASTM tests are used in the evaluation of the products obtained.

Tensile strength; ASTM D-412
Elongation; ASTM D-412
Tear strength; ASTM D-624

EXAMPLE I

A solution is made from the following components:

| Component | Weight, gms |
|---|---|
| Tetrahydrofuran (solvent) | 478.3 |
| Thermoplastic polyurethane [prepared by reacting poly-(tetramethylene glycol adipate) having a number average molecular weight of 1000, 4,4'-diphenyl-methane diisocyanate and 1,4-butanediol in a molar ratio of 1:2:1] | 105.0 |
| Hydroquinone diethylether | 12.20 |
| Adipodi(nitrile carbonate) | 14.05 |
| Zinc octoate | 0.66 |

The solution is cast in ⅛ inch deep aluminum molds and the solvent removed by evaporation overnight at 45° C. The dried sheets are cut up and ground to a powder at a reduced temperature using liquid nitrogen as refrigerant. The ground powder is vacuum dried at room temperature overnight. Moldings are made from the ground powder on a Carver Press using 6 inches by 6 inches stainless steel plates having a 0.1 inch spacer. Samples are molded at 173° C for ten (10) minutes at a pressure of 416 psig. The mold is cooled to 100° C before the pressure is released and the samples are removed.

The molded sheets are flexible and have a smooth skin and uniform cell structure. Physical tests are conducted on the samples and the following results are obtained:

| | |
|---|---|
| Tensile strength at break, psi | 630 |
| Elongation at break, % | 109 |
| Young's modulus, psi | 2774 |
| Tear strength (pounds per inch) | 175 |
| Density, g/cc | 0.68 |
| lb/ft³ | 41.8 |

EXAMPLE II

The procedure of Example I is repeated except that polyvinyl chloride having a number average molecular weight of 50,000 and a Vicat softening point of 80° C is substituted for the thermoplastic polyurethane. An expanded product having useful properties will be obtained.

EXAMPLE III

The procedure of Example I is repeated except that 1,3,6-hexane tri(nitrile carbonate) is substituted for the adipodi(nitrile carbonate) and a polyester polyol having a number average molecular weight of 1000 and a hydroxyl functionality of 5 groups per molecule is substituted for the hydroquinone diethylether. The resulting product will be a rigid polyurethane of reduced density.

EXAMPLE IV

A shelf-stable dry, powdered polyurethane-producing composition is prepared by combining the following components:

| Component | Weight, gms |
|---|---|
| Thermoplastic polyurethane [prepared by reacting poly-(ethylene adipate) and 1,4-butanediol with tolylene diisocyanate in a molar ratio of 1:1:2) to a molecular weight of 50,000] | 100 |
| Adipodi (nitrile carbonate) | 15 |
| Polyester polyol having a number average molecular weight of 1050 and a hydroxyl functionality of 2.0 (prepared by reacting 1,4-butanediol with phthalic acid) | 30 |
| Zinc Octoate | 0.7 |

The above composition is ground to an average particle size of 100 microns and stored under anhydrous conditions for six (6) months. At the end of this period the composition, upon examination, will be found to be in the same condition as when it was stored. When a quantity of the stored polymer composition sufficient to fill a mold three-fourths full is poured into the mold and heated to 180° C for 10 minutes, a foamed product having a reduced density and a shape and size conforming to the interior of the mold will be obtained.

Although the invention has been described with particular reference to specific examples it is understood that the scope of the invention is limited only by the breadth of the appended claims.

We claim:

1. A shelf-stable expandable polyurethane-producing composition comprised of
   A. about 100 to 200 parts by weight of a thermoplastic polyurethane having a softening point in the range of about 70°–250° C;
   B. about 20 to 100 parts by weight of a mixture comprised of
      1. a cyclic nitrile carbonate having the structural formula

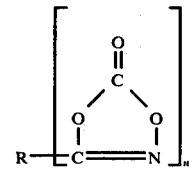

wherein R is an organic radical free of reactive hydrogens as determined by the Zerewitinoff test an $n$ is at least 2, and
      2. an organic polyol, the relative amounts of (1) and (2) present in the composition being such that the ratio of cyclic nitrile groups to total hydroxyl groups is about 0.7 to 10:1; and
   C. 0 to 10%, based on the total weight of (B), of a condensation-rearrangement catalyst.

2. The composition of claim 1 wherein (A) is a thermoplastic polyurethane.

3. The composition of claim 1 in dry powdered form.

4. The composition of claim 3 having a particle size of about 10 to 500 microns.

5. The composition of claim 1 wherein R is a hydrocarbon radical having 2 to 50 carbon atoms.

6. The composition of claim 5 wherein $n$ is 2 to 6.

7. The composition of claim 6 wherein (1) is adipodi(nitrile carbonate).

8. The composition of claim 1 wherein (A) is a thermoplastic polyurethane having a softening point in the range of about 100°–200° C.

9. The composition of claim 8 wherein (B) is present in an amount of about 40 to 80 parts by weight.

10. The composition of claim 9 wherein R is a hydrocarbon radical having 2 to 6 carbon atoms and (2) is a polyester-polyol or a polyether-polyol.

11. The composition of claim 9 wherein (1) is adipodi(nitrile carbonate) and (2) is a diol.

12. A shelf-stable expandable polyurethane-producing composition comprised of:
    A. about 100 to 200 parts by weight of a thermoplastic polyurethane having a softening point in the range of about 100° to 200° C;
    B. about 20 to 100 parts by weight of a polyurethane-producing component comprised of:
       1. a cyclic nitrile carbonate having the structural formula

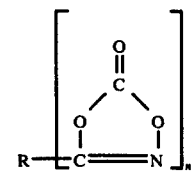

wherein R is a hydrocarbon radical containing 1 to 50 carbon atoms and $n$ is 2 to 6;

2. an organic compound containing at least 2 hydroxyl groups per molecule; the relative amounts of 1 and 2 being such that the ratio of cyclic nitrile carbonate groups to total hydroxyl groups present in the reaction mixture is about 0.8 to 1.4:1; and C. 0 to 10% based on the total weight of (B) of a condensation-rearrangement catalyst.

13. The composition of claim 12 wherein (1) is adipodi(nitrile carbonate), (2) is a hydrocarbon polyol, and (C) is present in an amount of about 0.1 to 2%, based on the total weight of (B).

14. A method of producing a shaped, expanded polyurethane article comprising the steps of:
A. preparing a mixture comprised of:
1. about 100 to 200 parts by weight of a thermoplastic polyurethane having a softening point in the range of about 70 to 250° C;
2. about 50 to 100 parts by weight of a polyurethane-producing component comprised of:
a. a cyclic nitrile carbonate having the structural formula

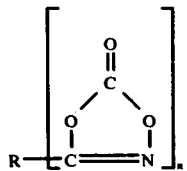

wherein R is a hydrocarbon radical containing 1 to 50 carbon atoms and $n$ is 2 to 6, and
b. an organic compound containing at least 2 hydroxyl groups per molecule, the relative amounts of (a) and (b) being such that the ratio of cyclic nitrile carbonate groups to total hydroxyl groups present in the reaction mixture is about 0.7 to 10:1; and
3. 0 to 10%, based on the total weight of (2), of a condensation-rearrangement catalyst, B. heating said mixture in a closed container to the temperature at which reaction between (a) and (b) occurs, thereby causing the mixture to expand to fill the container and assume the shape of the container,
C. cooling the expanded composition to below about 100° C,
D. removing the shaped, expanded polyurethane article from the container.

15. A method of producing expanded polyurethane material comprising the steps of:
A. preparing a mixture comprised of:
1. about 100 to 200 parts by weight of a thermoplastic polyurethane having a softening point in the range of about 70° to 250° C;
2. about 50 to 100 parts by weight of a polyurethane-producing component comprised of:
a. a cyclic nitrile carbonate having the structural formula:

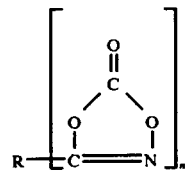

wherein R is a hydrocarbon radical containing 1 to 50 carbon atoms and $n$ is 2 to 6;
b. an organic compound containing at least 2 hydroxyl groups per molecule, the relative amounts of (a) and (b) being such that the ratio of cyclic nitrile carbonate groups to total hydroxyl groups present in the reaction mixture is about 0.8 to 1.4:1; and
3. 0 to 10%, based on the total weight of (2), of a condensation-rearrangement catalyst, B. heating said mixture in the barrel of an extruder to the temperature at which reaction between (a) and (b) occurs, and
C. extruding the heated mixture through a die.

* * * * *